(12) United States Patent
Gagliano et al.

(10) Patent No.: US 7,798,118 B2
(45) Date of Patent: Sep. 21, 2010

(54) METHOD AND APPARATUS FOR INCORPORATION OF A FLAME FRONT—TYPE IGNITION SYSTEM INTO AN INTERNAL COMBUSTION ENGINE

(75) Inventors: Howard Gagliano, Kingston, TN (US); Marion Satterfield, Oak Ridge, TN (US)

(73) Assignee: Econo Plug Technologies Inc., Kingston, TN (US)

( * ) Notice: Subject to any disclaimer, the term of this patent is extended or adjusted under 35 U.S.C. 154(b) by 351 days.

(21) Appl. No.: 12/109,795

(22) Filed: Apr. 25, 2008

(65) Prior Publication Data

US 2008/0196689 A1 Aug. 21, 2008

Related U.S. Application Data

(63) Continuation-in-part of application No. 11/622,801, filed on Jan. 12, 2007, now abandoned, and a continuation-in-part of application No. 11/689,852, filed on Mar. 22, 2007, now abandoned.

(51) Int. Cl.
*F02B 19/12* (2006.01)
*F02B 19/18* (2006.01)
*H01T 13/08* (2006.01)

(52) U.S. Cl. ................ 123/266; 123/169 PA; 123/273; 123/293

(58) Field of Classification Search ............. 123/169 R, 123/169 PA, 260, 266, 268, 273, 293, 143 R, 123/143 B; 313/143
See application file for complete search history.

(56) References Cited

U.S. PATENT DOCUMENTS

| | | | |
|---|---|---|---|
| 3,665,902 A | 5/1972 | Bloomfield | |
| 4,092,969 A | 6/1978 | Ono et al. | |
| 4,175,501 A | 11/1979 | Noguchi et al. | |
| 4,218,993 A | 8/1980 | Blackburn | |
| 4,242,990 A | 1/1981 | Scherenberg et al. | |
| 4,646,695 A | 3/1987 | Blackburn | |
| 4,696,269 A | 9/1987 | Blackburn | |
| 4,930,473 A * | 6/1990 | Dietrich | 123/266 |
| 5,109,817 A * | 5/1992 | Cherry | 123/266 |
| 5,554,908 A * | 9/1996 | Kuhnert et al. | 313/140 |
| 6,216,669 B1 | 4/2001 | Aoki | |
| 7,066,137 B1 | 6/2006 | Dawson | |

(Continued)

FOREIGN PATENT DOCUMENTS

GB 2219624 A * 12/1989 ............ 123/266

*Primary Examiner*—Willis R Wolfe, Jr.
(74) *Attorney, Agent, or Firm*—Pitts & Brittian, PC

(57) ABSTRACT

A method and apparatus for installation and functioning of a flame front type ignition system in a throughbore through the wall of the head of an internal combustion engine. The flame front ignition system employs a flame cone which is threadably inserted within the throughbore. The inboard end of the flame cone is provided with a plurality of exit ports opening from a central channel and into the combustion chamber. The flame cone is provided with indicia on its outboard face and a marker is provided on the outer rim of the throughbore. When an indicia letter on the flame cone is aligned with the marker, the flame cone is properly installed. The depth of insertion of the flame cone is adjustable by means of spacer washers adapted to selectively adjust the dept as well as seal the flame cone in the throughbore.

7 Claims, 6 Drawing Sheets

U.S. PATENT DOCUMENTS 7,104,245 B2 * 9/2006 Robinet et al. .............. 123/266
7,104,246 B1 9/2006 Gagliano et al.
7,637,239 B2 * 12/2009 Gagliano et al. ............ 123/266

* cited by examiner

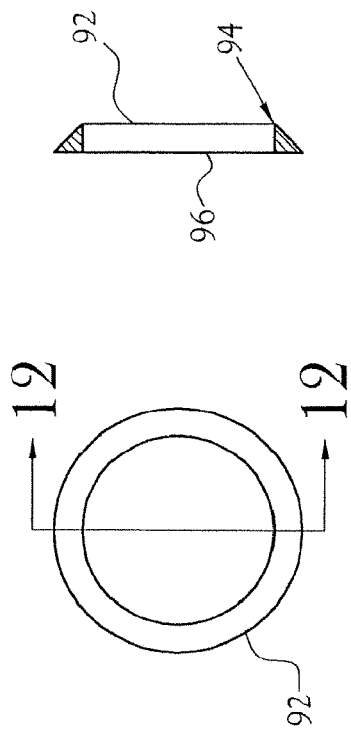
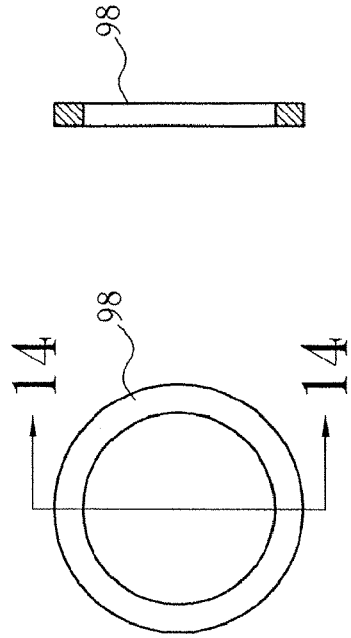
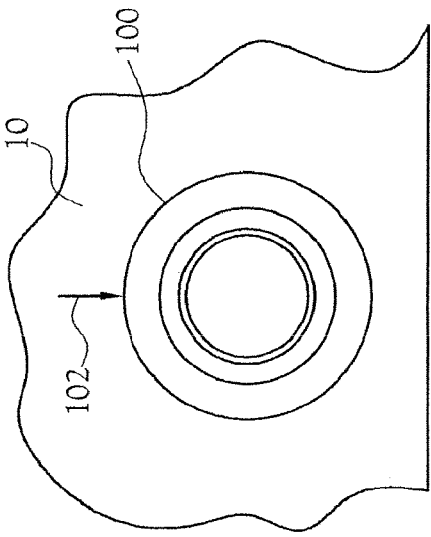
| Letter | Washer Thickness mm |
|---|---|
| A | none |
| B | 0.104 |
| C | 0.208 |
| D | 0.312 |
| E | 0.416 |
| F | 0.520 |
| G | 0.624 |
| H | 0.728 |
| I | 0.832 |
| J | 0.936 |
| K | 1.040 |
| L | 1.144 |
Fig.11
Fig.12
Fig.13
Fig.14
Fig.15
Fig.16

METHOD AND APPARATUS FOR INCORPORATION OF A FLAME FRONT—TYPE IGNITION SYSTEM INTO AN INTERNAL COMBUSTION ENGINE

CROSS-REFERENCE TO RELATED APPLICATIONS

This application is a continuation-in-part application of co-pending U.S. patent application Ser. No. 11/622,801, filed Jan. 12, 2007, entitled: SPARK IGNITION MODIFIER MODULE AND METHOD, and a continuation-in-part of co-pending U.S. patent application Ser. No. 11/689,852, filed Mar. 22, 2007, entitled: IGNITION SYSTEM FOR INTERNAL COMBUSTION ENGINE, the whole of each of the aforesaid applications being incorporated herein by reference and upon which priority is claimed.

STATEMENT REGARDING FEDERALLY SPONSORED RESEARCH OR DEVELOPMENT

Not Applicable

FIELD OF INVENTION

This invention relates to ignition systems for internal combustion engines, and more particularly those ignition systems employing multiple flame fronts for gross ignition of a fuel/air mixture contained within a combustion chamber of the engine.

BACKGROUND OF INVENTION

Relatively recently there have been developed various proposals for ignition systems for internal combustion engines (ICE) wherein a quantity of fuel/air mixture disposed within a combustion chamber of the engine is ignited by means of one or more flame fronts. Such flame fronts are derived from a single flame front which is initiated within an auxiliary pre-combustion chamber which, in turn, is physically separated from the main combustion chamber of the ICE. From this initial ignition point, the flame propagates along a channel leading from the initial ignition point to the combustion chamber. Herein at times, this channel is referred to synonymously as the "first channel" or as the "first central channel". The flame front moving through the first channel is divided into one or more flame fronts, each of which exits separately, from the channel and into the combustion chamber via respective lateral channels. Commonly, a flame front exits into the combustion chamber via the first channel and separate flame fronts exits into the combustion chamber via the one or more lateral channels. Much attention has been paid to the respective directional orientation of the first channel and the lateral channels (and their associated flame fronts) into the combustion chamber, with the desire to maximize the simultaneity and completeness of ignition of the fuel/air mixture disposed within the combustion chamber.

Of major concern in certain flame front-type ignition systems is how one goes about installation of a flame front ignition system in operative relationship to an existing internal ICE so that the orientation of the flame fronts from the flame cone are directed toward specific locations within the combustion chamber which have been determined to produce maximized simultaneity of ignition and completeness of combustion of the fuel/air mixture disposed within the combustion chamber. This problem is of particular significance when seeking to convert an ICE from a non-flame front ignition system to a flame front ignition system.

It is to be noted that in all known four-stroke ICEs, there is an internal combustion chamber which is fitted with at least one intake valve, at least one exhaust valve and some means, most commonly at least one spark plug, which serves to ignite a fuel/air mixture drawn into the combustion chamber via the intake valve. In certain of the prior art non-flame front ignition systems the spark plug is threaded into a throughbore provided through the wall thickness of the head of the ICE to the extent that the electrodes of the spark plug are exposed directly within the combustion chamber. Herein, this non-flame cone embodiment is at times referred to as the "standard" system.

On the other hand, in flame front ignition systems, most commonly, the electrodes of the spark plug are disposed within an auxiliary pre-combustion chamber which is at least semi-isolated from the interior of the combustion chamber. In the compression stroke of the ICE, fuel/air mixture from the combustion chamber is fed into the auxiliary pre-combustion chamber. Thereafter, the firing of the spark plug ignites the fuel/air mixture within the auxiliary pre-combustion chamber and the flame front which is developed propagates along the first channel toward the combustion chamber. In this system, before this flame front exits the first channel, the initial flame front is divided in multiple separate flame fronts as by means of a flame cone. These multiple flame fronts exit the flame cone into the combustion chamber where they ignite the fuel/air mixture disposed with the combustion chamber.

In one embodiment of a flame front pre-ignition system as described in Applicant's copending application Ser. No. 11/622,801, filed Jan. 12, 2007, entitled SPARK IGNITION MODIFIER MODULE AND METHOD, once the desired orientation of flame fronts exiting a flame cone are determined, a flame cone having such oriented exit channels may be manufactured. One prior art technique for aligning such flame cone within the throughbore, hence the directionality of its exiting flame fronts, includes the use of a flame cone which is insertable into the throughbore from a location internally of the combustion chamber. In this latter technique, the flame cone is threaded into the inboard end of the throughbore until the flame cone is securely, but not necessarily fully, threaded into the throughbore. At this point, the rotation of the flame cone within the throughbore is adjusted such that the directionality of the flame exit ports are in their desired orientation with respect to pertinent ones of the elements disposed within the combustion chamber of the ICE. Thereupon means is required to lock the flame cone in its selected rotational position within the throughbore. Thereafter the spark plug is inserted into the opposite external end of the throughbore and/or the outboard end of the flame cone. This technique requires access to the combustion chamber of the ICE, e.g., removal of the cover of the head of the engine.

In another technique, described in Applicant's U.S. Pat. No. 7,104,246, entitled SPARK AMPLIFIER, the rotational position of the exit channels of the flame cone are established in the course of manufacturing the flame cone and the flame cone is thereafter inserted into the throughbore starting at the outboard open end of the throughbore (i.e. starting externally of the head). This technique addresses the problem of bottoming out the threading of the flame cone into the throughbore at a location which is inconsistent with the desired rotational orientation of the flame cone, hence the rotational orientation of its exit flame front channels.

It is recognized that two stroke engines, like in engines for chain saws, etc., do not have valves. Moreover some engines have more than one spark plug per cylinder. One skilled in the art will further recognize the applicability of the present invention to these and/or other internal combustion engines.

BRIEF DESCRIPTION OF THE FIGURES

FIG. 11 is a top view of one embodiment of a conical spacer washer employed in the present invention;

FIG. 12 is a side view, in section, of the conical spacer washer depicted in FIG. 11;

FIG. 13 is a top view of one embodiment of a flat spacer washer employed in the present invention;

FIG. 14 is a side view, in section, of the flat spacer washer depicted in FIG. 13;

FIG. 15 is one embodiment of a lookup table relating the thicknesses of various spacer washers associated with the alpha lettering applied to the outer face of the top end of a flame cone of the present invention; and, FIG. 16 is schematic representation of the outer face of a portion of a head wall of an ICE and depicting the outboard open end of a throughbore extending through the thickness of the head wall.

SUMMARY OF INVENTION

Figure 1:
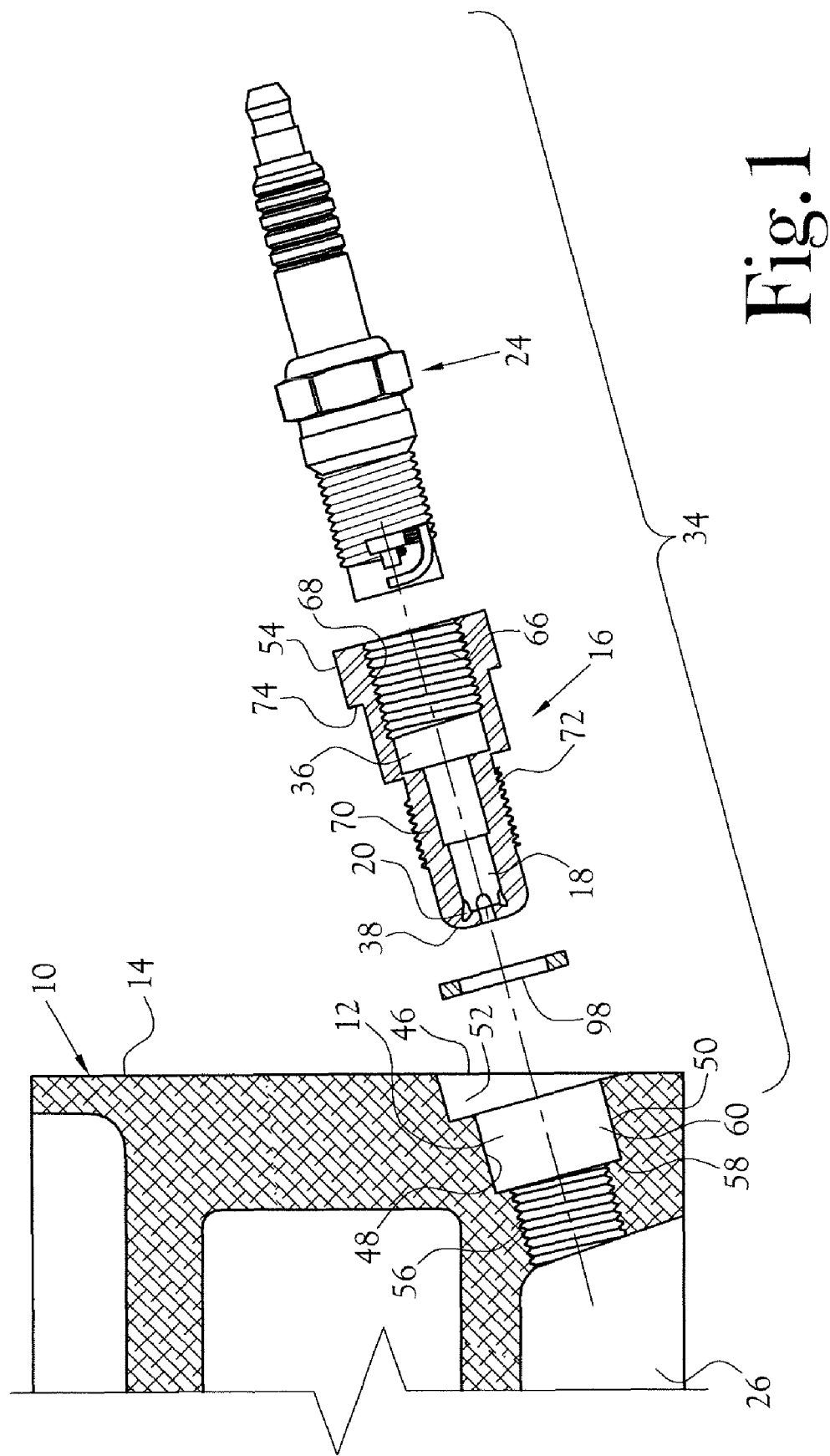
FIG. 1 is a schematic representation of a portion of a head of an ICE and depicting a flame cone and spark plug in exploded view and including a flat adjustment spacer washer of the present invention.

In accordance with one aspect of the present invention there is provided a method and apparatus for installation and functioning of a flame front type ignition system in the conventional throughbore through the wall of the head of an internal combustion engine. This installation is effected from a location external of the head and while the head is affixed in covering relationship to one or more combustion chambers of the internal combustion engine. In one embodiment, there is employed a flame cone which is threadably inserted within the throughbore proximate the inboard end of the throughbore. The inboard end of the flame cone is provided with a plurality of exit ports opening from a first central channel within the flame cone thence into the combustion chamber along preselected paths.

The flame cone of the present invention is provided with one or more alpha letters on the outboard face of the flame cone where they are visible to a person threading the flame cone into the throughbore. Further, a marker (e.g. an arrow) is provided on the outer rim of the throughbore. A datum alpha letter ("A" in the present disclosure) is aligned on the face of the flame cone in a position which, when aligned with the marker on the rim of the throughbore, indicates that the flame cone is at the proper rotational attitude within the throughbore wherein the exit ports in the flame cone are correctly angularly oriented within the throughbore such that flame fronts exiting such ports are also properly aligned relative to those locations within the combustion chamber toward which flame fronts desirably are directed for ignition purposes.

The depth of insertion of the flame cone into the throughbore through the wall of the head of the ICE, is adjustable by means of spacer washers adapted to selectively adjust such depth of sealing insertion of the flame cone within the throughbore as a function of the angular orientation of the exit ports for flame fronts entering the combustion chamber of the ICE.

In one embodiment of the method of the present invention, the flame cone is threadably inserted into the throughbore until the flame cone sealingly seats itself against a circumferential shoulder disposed within the throughbore. The torque employed to sealingly seat the flame cone is established and published by the provider of the engine. Also noted is the alpha letter on the face of the flame cone which is closest to the arrow marker disposed on the outboard rim of the throughbore. Thereupon, the flame cone is withdrawn from the throughbore.

Using the information obtained with the flame cone, a spacer washer having an alpha letter (representative of the thickness of the spacer washer) corresponding to the alpha number noted to be nearest the marker on the rim of the throughbore, is chosen and inserted within the throughbore in overlying relationship to the circumferential shoulder or, alternatively and preferably, is fitted over the threaded end of the flame cone. Thereupon the flame cone and the washer(s) on the threaded end thereof are sealingly reinserted into the throughbore, employing the same torque (supplied by engine provider as initially noted). This action longitudinally and rotationally spaces and seals the flame cone within the throughbore such that the "A" alpha letter on the flame cone becomes aligned with the marker on the rim of the throughbore, thereby indicating that the exit ports of the flame cone are aligned as desired within the combustion chamber.

DETAILED DESCRIPTION OF THE INVENTION

In FIG. 1, there is depicted a partially exploded view of a portion of the head 10 of an ICE, a typical throughbore 12 through the wall 14 of the head, a flame cone 16, having multiple flame front exit channels 18, 20 and 22, threadably insertable into the throughbore, and a conventional spark plug 24 threadably insertable into the flame cone. The general apparatus depicted in FIG. 1 is more fully described in Applicant's copending application Ser. No. 11/689,852, filed Mar. 22, 2007, entitled IGNITION SYSTEM FOR INTERNAL COMBUSTION ENGINE, such description being incorporated herein by reference.

Figure 2:
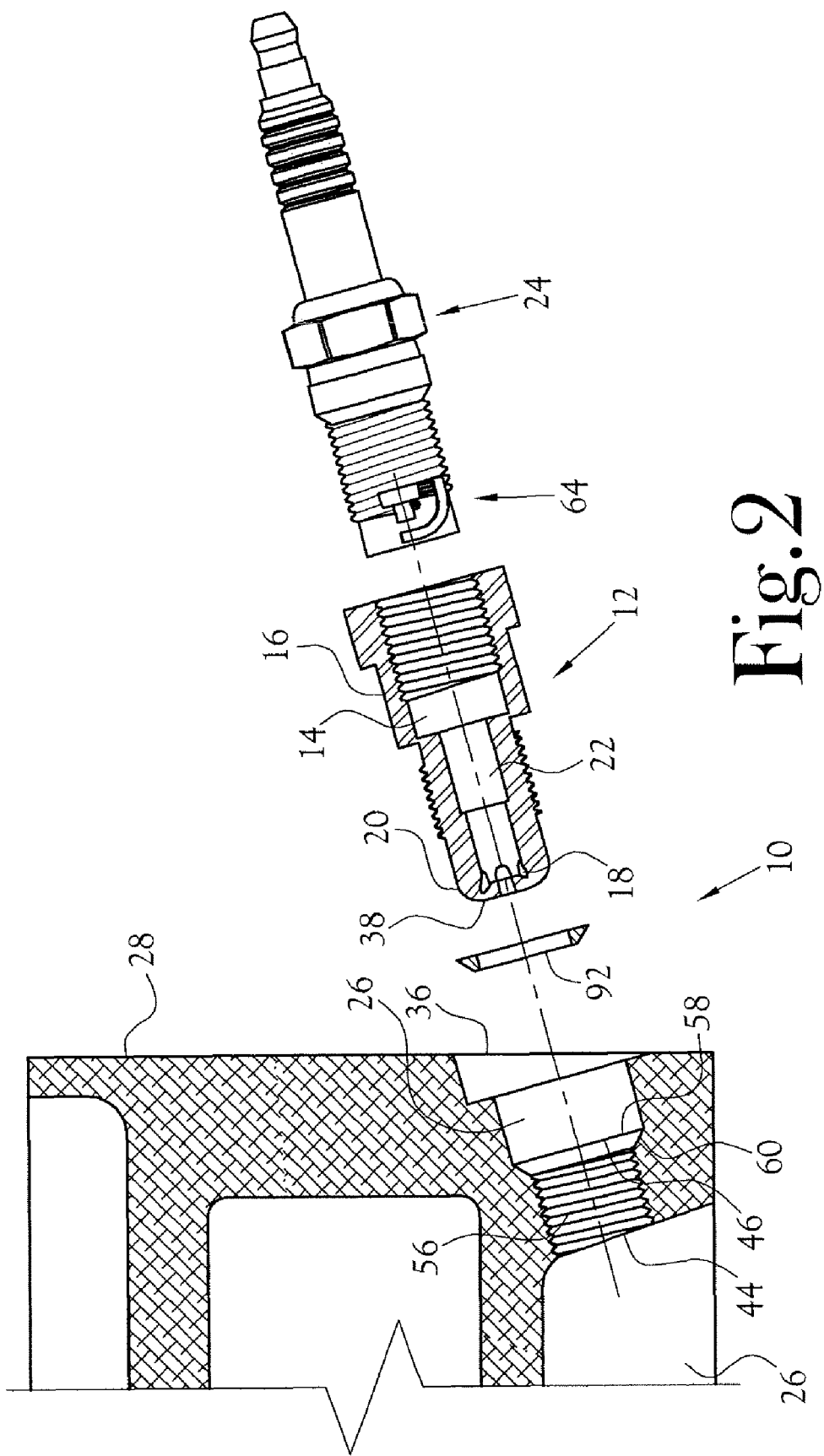
FIG. 2 is a schematic representation of a portion of a head of an ICE as depicted in FIG. 1 and including a conical adjustment spacer washer of the present invention.
Figure 3:
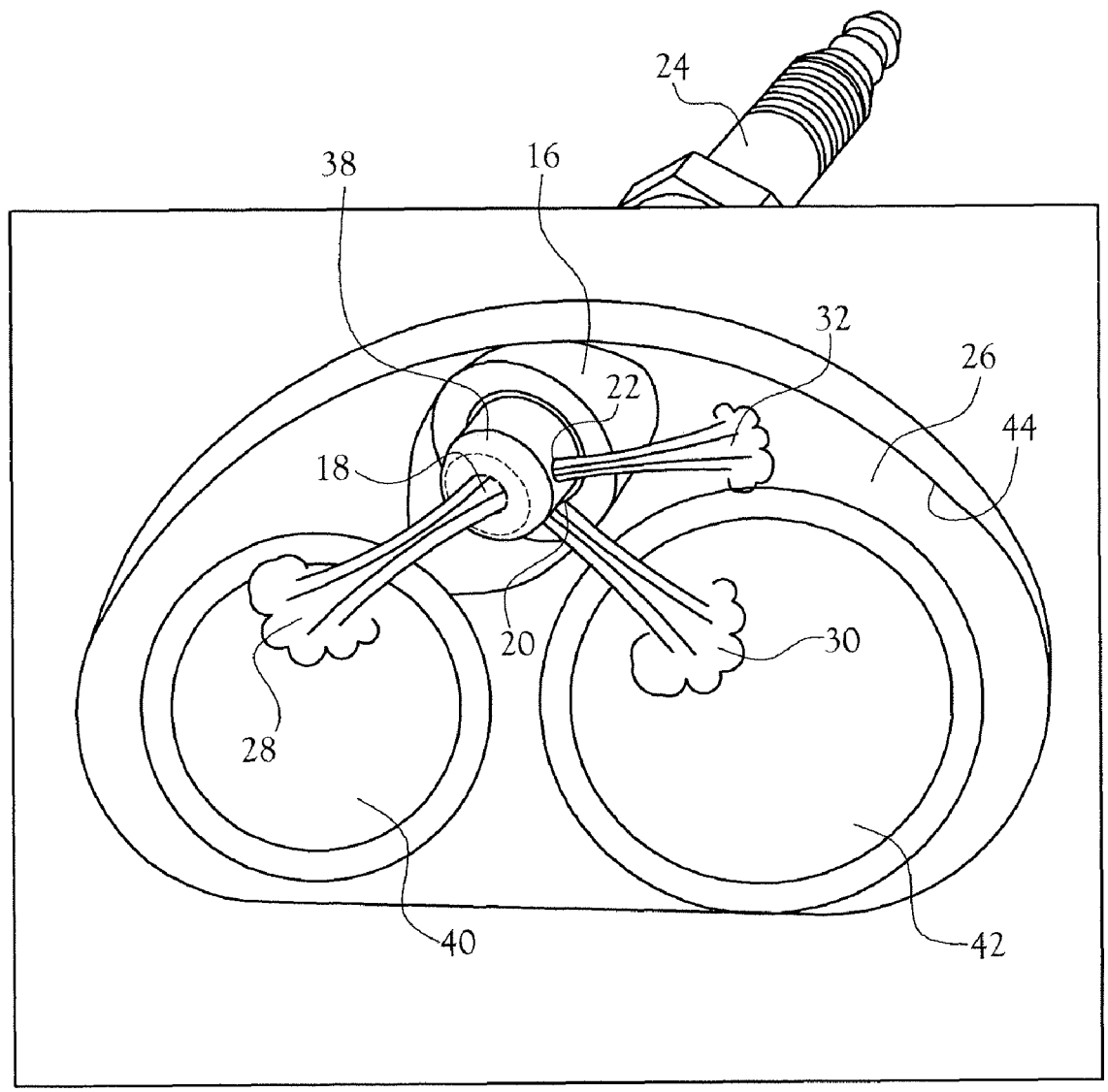
FIG. 3 is a schematic representation of a portion of an ICE combustion chamber and depicting the directionality of various flame fronts entering the combustion chamber.

Referring to FIGS. 1 and 2 of the present application, it will be noted that the desired orientations of the multiple exit channels 18, 20, 22 through which multiple flame fronts 28, 30, 32 enter the combustion chamber 26 (See FIG. 3) are determined analytically once the internal geometry of the combustion chamber is known. Determining the internal geometry of the combustion chamber requires access to the design data for the ICE, or it must be determined by examination of the disassembled engine, all as is well known to those skilled in the art. In accordance with one aspect of the present invention, flame fronts 28, 30, 32 from respective individual ones of the exit channels 18, 20, 22 of the flame cone are directed along predetermined paths selected to maximize the simultaneity and completeness of the ignition of the fuel/air mixture disposed within the combustion chamber. (See embodiments depicted in FIGS. 1, 2 and 3 of the present application).

In one embodiment of the present invention, as depicted in FIG. 1, the pre-combustion system 34 includes a flame cone 16, a pre-combustion chamber 36 defined in the inboard end 38 of the cone, at least one flame front exit channel 18 defined in the cone and leading from the pre-ignition chamber toward the combustion chamber of the ICE. This first exit channel 18 is directionally oriented to direct its flame front 28 toward the intake valve 40 of the ICE. In the depicted embodiment, there is provided a first lateral channel 20 (See FIGS. 1, 2 and 3) whose flame front 30 is directionally oriented toward the exhaust valve 42 and a second lateral channel 22 whose flame front 32 is directionally oriented generally tangentially toward the inner wall 44 of the combustion chamber of the ICE. If desired, one or more lateral channels 23 may be provided whose directional orientation may be chosen to direct a flame front from the cone into the combustion chamber of the ICE toward some further location within the combustion chamber, such as tangentially along the inner wall of the combustion chamber in a direction opposite the direction of the flame front 32 exiting the second lateral channel 22.

In the depicted embodiment of FIGS. 1 and 2, the throughbore 12 through the wall 14 of the head 10 of the ICE includes a first outboard open end portion 46 and an inboard open end portion 56. The outboard open end portion 46 of the throughbore 12 in the depicted embodiment may have smooth inner 48 and outer 50 surfaces and a diameter which is materially greater that the outer diameter of a conventional spark plug suitable for use in the depicted head of the ICE, thereby defining a void open annular space 52 between the inner surface 48 of the throughbore and the spark plug and the hexagonal head 54 of the flame cone. This annular space is useful for the receipt therein of a torque wrench, for example, for establishing the required depth of insertion of the flame cone into the throughbore.

The transition between the outboard 46 and inboard end 56 portions of the throughbore defines a circumferential shoulder 58 internally of the throughbore at a location approximately midway between the opposite ends of the throughbore. As depicted in FIG. 1, this transition includes an inwardly directed flat surface 60. In the present invention and as depicted in FIG. 2, for example, it is to be recognized that the circumferential shoulder within the throughbore may define a sloping surface which extends angularly inward of the throughbore, i.e., conical instead of a flat surface as depicted in FIG. 1.

In accordance with one aspect of the present invention a plurality of identical flame cones 16, specific for a given engine type, may be manufactured. Each flame cone includes at least one, and most commonly a plurality of, exit channels which are specifically directionally oriented such that the exit paths of respective ones of flame fronts exiting such channels from the inboard end of the flame cone are directed toward respective specific areas within the combustion chamber of that engine for which the flame cone is designed.

FIGS. 4-9 depict one embodiment of a flame cone which includes a first central channel 18 and first and second lateral channels 20 and 22, respectively, in the inboard end 38 of the flame cone. The depicted flame cone is designed for a specific engine type, but the method for manufacture and identification of the depicted flame cone is deemed typical for any other known ICE types.

Figure 4:
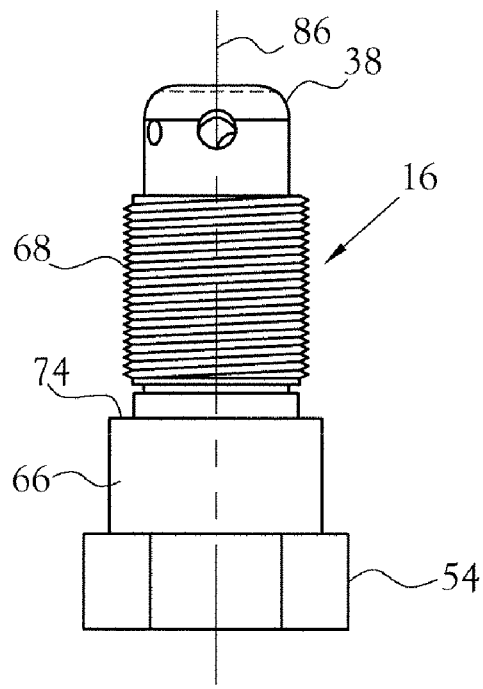
FIG. 4 is a side elevation view of a flame cone embodying various of the features of the present invention.

With reference initially to FIG. 4, the depicted embodiment of the flame cone is generally tubular in geometry. The cone includes an outer body portion 66 having internal threads 68 suitable for the threadable insertion of a conventional spark plug therein. The geometry of the first outer body portion 66 of the depicted flame cone includes a hexagonal head 54. The cone further includes an inboard body portion 70 which is externally threaded 72 to be threadably inserted into the internally threaded inboard end 56 of the throughbore 12 in the wall of the engine of an ICE. A typical throughbore and a flame cone threadably insertable therein may be provided along the length of their respective threaded areas with threads of a known standard type such as M14-1.25 ISO threads.

The transition between the first and second body portions of the flame cone includes a circumferential shoulder 74 about the outer periphery of the cone, such shoulder including a flat surface 76 which projects substantially perpendicularly away from the cone. The flame cone, therefore, may be threadably inserted into the throughbore to a depth limited by the outer circumferential shoulder of the flame cone sealingly engaging the inner circumferential shoulder 58 of the throughbore, thereby limiting the extent to which a flame cone can be inserted into the throughbore.

Further, internally of the flame cone there is defined a chamber 78 which ultimately becomes a portion of the pre-combustion chamber 36 of the pre-ignition flame front ignition system 34 for the ICE.

The first central channel 18 of the depicted flame cone extends in fluid communication from the pre-combustion chamber 36 to the combustion chamber 26 of the ICE. Proximate the inboard end of the first central channel, there are defined first and second separated individual lateral exit channels 20, 22 which lead, in fluid communication, from the first central channel into the combustion chamber. Each of the channels terminates within the combustion chamber, but proximate to the inner circumferential wall 44 of the combustion chamber such that the directionality of the flame front exiting each channel is not diverted or impeded from its preselected path into the combustion chamber. (See FIGS. 1-3 and 4-10).

As noted, the first central channel is in fluid communication between the pre-combustion chamber and the combustion chamber of the ICE. Similarly, each of the first and second lateral channels are in fluid communication from the first channel into the combustion chamber. This arrangement of channels serves to divide a flame front propagating from the pre-combustion chamber through the first central channel into three individual flame fronts. These flame fronts are individually directionally oriented to cause the flame front from the first central channel to be directed toward the intake valve 40 in the combustion chamber and the flame front from the first lateral channel to be directed toward the exhaust valve 42 in the combustion chamber 20. The flame front from the second lateral channel may be directionally oriented tangentially along the inner wall 44 of the combustion chamber, or toward another location within the combustion chamber. In one embodiment, the internal diameter of the first central channel is chosen to be larger than the internal diameter of one or more of the first and second lateral channels, particularly the internal diameter of the first lateral channel which is directed toward the exhaust valve of the ICE. This geometry causes the flame front exiting the first lateral channel 20 to exhibit a greater velocity of forward movement than the velocity of the flame front exiting the first central channel. By this, or like manipulation of the several flame fronts, ignition of the fuel/air mixture disposed within the combustion chamber may be of enhanced simultaneity, among other advantages.

Figure 5:
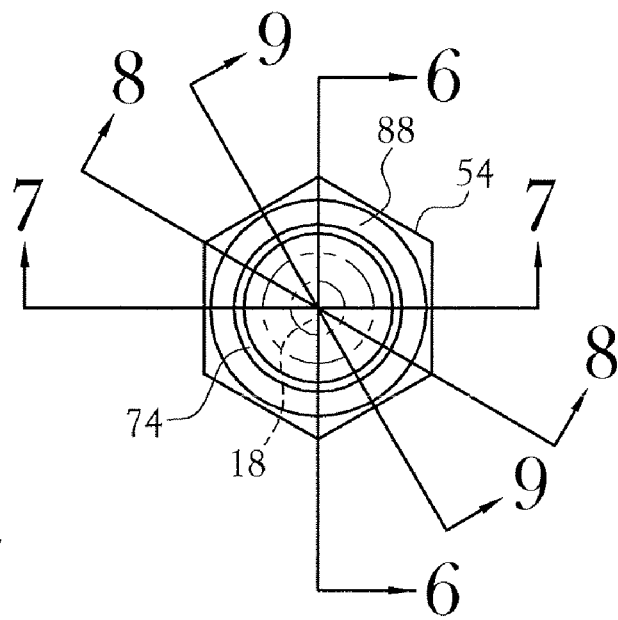
FIG. 5 is a top end view of the flame cone depicted in FIG. 4.
Figure 6:
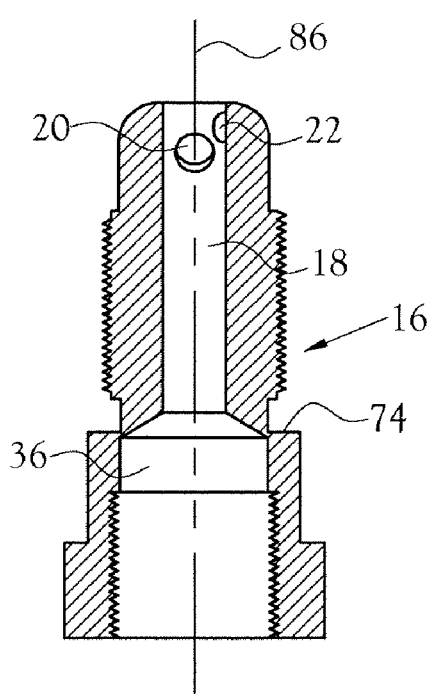
FIG. 6 is a side elevation view, in section, of a flame cone as depicted in FIG. 4 and taken generally along the line 6-6 of FIG. 5.

FIGS. 6-9 depict various longitudinal sectional views of the flame cone of FIG. 5. FIG. 6 depicts the lines along which each of the sectional views of FIGS. 6-9 are taken, each line lying along a diameter of the outboard end of the flame cone and all of which intersect one another at the longitudinal centerline 80 of the cone. In each such sectional view, there is depicted an angular relationship of the longitudinal centerline of the depicted embodiment of the flame cone with the respective longitudinal centerline 82, 84 of the two lateral channels in the depicted cone.

Figure 7:
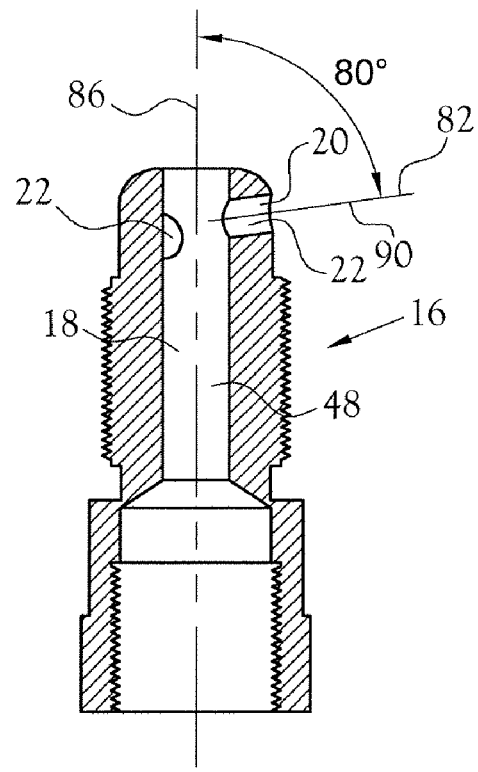
FIG. 7 is a side elevation view, in section, of a flame cone as depicted in FIG. 4 and taken generally along the line 7-7 of FIG. 5.

As depicted in FIG. 7, the longitudinal centerline 82 of the first central channel may be oriented at an angle of 80 degrees relative to the longitudinal centerline 86 of the cone. This geometry of the first central channel is preferred, but it will be recognized that the placement of the first central channel within the cone may be chosen to be at a location which is not only displaced from the centerline of the cone, but also may be of a less than straight geometry.

Figure 8:
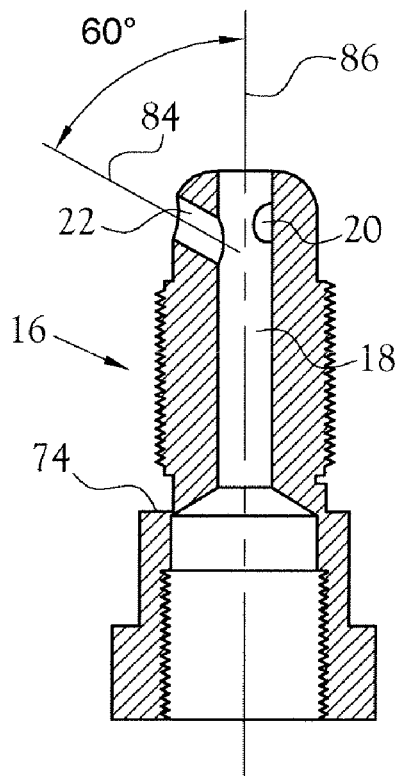
FIG. 8 is a side elevation view, in section of a flame cone as depicted in FIG. 4 and taken generally along the line 8-8 of FIG. 5.
Figure 9:
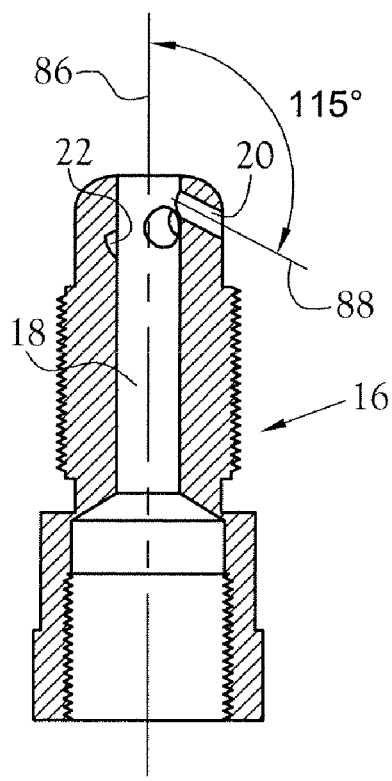
FIG. 9 is a side elevation view, in section, of a flame cone as depicted in FIG. 4 and taken generally along the line 9-9 of FIG. 5.

With reference to FIGS. 7 and 9, there are depicted locations of the first and second lateral channels through which separate flame fronts enter the combustion chamber. In the embodiment of FIG. 7, the longitudinal centerline 82 of the first lateral channel 20 may be angularly oriented at an angle of 80 degrees relative to the longitudinal centerline 86 of the flame cone when viewed along line 7-7 of FIG. 5. In similar manner, as seen in FIG. 8, the longitudinal centerline 84 of the second lateral channel 22 may be oriented at an angle of 60 degrees relative to the longitudinal centerline of the flame cone when viewed along line 8-8 of FIG. 5. Still further, as seen in FIG. 9, the longitudinal centerline of the first lateral channel 20 may be oriented at an angle of 115 degrees relative to the longitudinal centerline of the cone when viewed along line 9-9 of FIG. 5. These angular relationships are chosen to satisfy the requirement that when the flame cone is properly inserted into the throughbore, the flame front from the first central channel be directed toward the intake valve within the combustion chamber, that the flame front from the first lateral channel be directed toward the exhaust valve within the combustion chamber, that the second lateral channel be directed tangentially of the inner wall of the combustion chamber. As noted, these angular relationships may be varied to suit a given geometry within the combustion chamber of known ICE's.

Figure 10:
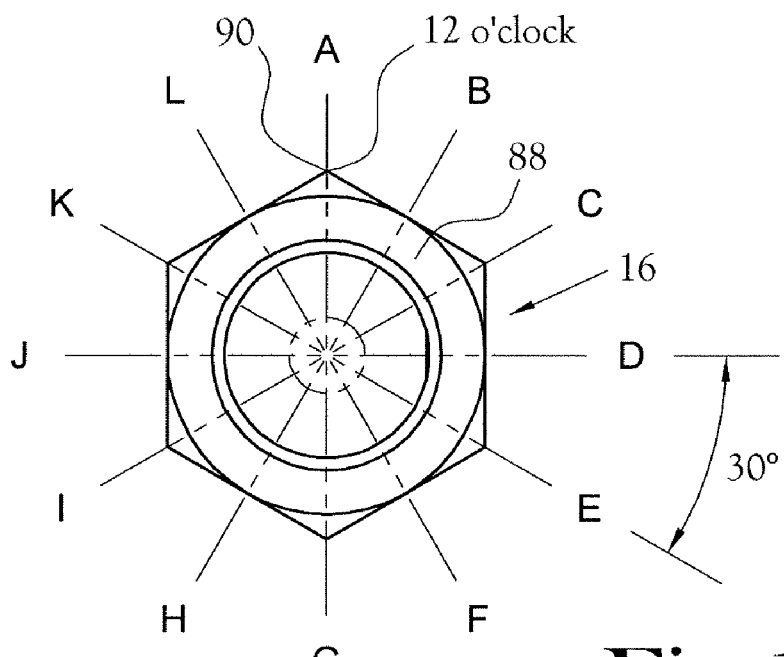
FIG. 10 is a top view of the flame cone depicted in FIG. 4 and illustrating the marking of alpha letters on the outer face of the flame cone.

Referring to FIG. 10, in particular, the flame cone therein depicted is the same as the flame cone 16 depicted in FIGS. 4-9. After the flame cone depicted in the several Figures has been formed, including the formation of the channels described hereinabove, the outboard face 88 of the flame cone is marked with alpha letters, e.g. "A" through "L". The "A" letter is assigned to that location on the face of the cone referred to in the Figures as the 12 O'clock position. For convenience, the "A" letter is located at the apex 90 of the angular junction of two adjacent ones of the segments of the hexagonal head 54 of the flame cone 16. In the depicted embodiment, the lettering of the cone proceeds clockwise about the outer periphery of the face of the cone at intervals of 30 degrees between adjacent letters in the embodiment depicted in FIGS. 11 and 12.

As depicted in FIG. 2, in certain "conical head" ICE's the throughbore is provided with a shoulder which includes an inwardly angled surface 60 extending circumferentially about the inner wall of the throughbore at the transition. Thus, when a flame cone is threaded into the throughbore, without more, the circumferential flat surface 76 defined on the flame cone would engage the angled surface of the circumferential flange defined in the throughbore. This situation is undesirable due to the lack of precision of engagement of these differently configured surfaces and the assurance of sealing therebetween when the flame cone is torqued against the shoulder within the throughbore. To overcome this potential problem, in one aspect of the present invention, the inventor provides a conical shaped washer 92 such as depicted in FIGS. 2, 11 and 12. As seen in FIGS. 2 and 12, such washer includes a first side 94 having a conical-shaped outer perimetral surface. A second, and opposite side 96 of the washer defines a flat surface. The outer diameter of the washer is chosen to permit substantially snug fit of the washer within the throughbore and in overlying relationship to the angled surface circumferential shoulder 58 of the throughbore with the flat side 96 of the conical washer facing away from the shoulder of the throughbore.

The circumferential shoulder disposed within the throughbore and which slopes inwardly of the throughbore may be referred to as a "conical" head engine (See FIG. 2). For consistency of effective physical sealing engagement of the "square" shoulder of a flame cone with the conical circumferential shoulder of the throughbore, the present inventor provides a "conical" spacer washer 92 of a thickness suitable to "fill" the conical volume of the circumferential shoulder of the throughbore, thereby redefining this shoulder as a flat shoulder having its exposed surface disposed substantially perpendicular to the longitudinal centerline of the throughbore and facing away from the shoulder of the throughbore. When so employed, this conical spacer washer is retained on the threaded end of the flame cone, along with other flat spacer washers 98 added to adjust the depth of insertion of the flame cone into the throughbore. It will be also recognized that such conical spacer washers are not needed when the circumferential shoulder within the throughbore is a "square" shoulder having a face which is oriented substantially perpendicular to the longitudinal centerline of the throughbore as depicted in FIG. 1.

Accordingly, when the flame cone is thereafter threaded into the throughbore, the flat surface of the circumferential shoulder of the flame cone precisely engages the flat surface of the washer, thereby providing for precise depth positioning of the flame cone within the throughbore upon repeated entry and removal of such flame cone with respect to the throughbore. Moreover, such geometrical mating of the flat surfaces of the two circumferential shoulders permits the flame cone to be repeatedly torqued into a specified fluid sealing engagement with the shoulder within the throughbore upon repeated entry and removal events of the flame core into and from the throughbore.

Referring to FIG. 16, it will be noted that in accordance with one aspect of the present invention, the outer rim 100 of the throughbore is provided with a marker 102 (e.g. an arrow) which is readily visualized by a person disposed proximate, but externally of, the head 10 of the ICE. The exact location of this marker about the periphery of the rim is not critical, but rather its location must represent the precise threaded depth of the flame cone into the throughbore wherein the datum "A", is aligned with the marker, hence the exit channels in the inboard end of the flame cone are properly aligned such that their respective flame fronts are directionally oriented toward their respective target locations within the combustion chamber. For example, the first lateral exit channel is to be oriented in the direction of the exhaust valve disposed within the combustion chamber.

Toward this end, the outboard face 88 of the flame cone is divided into spaced apart identified locations about the periphery of the face. Each such location is assigned an alpha letter. As depicted, in a preferred embodiment, these lettered locations proceed alphabetically clockwise, at equally spaced apart distances, about the periphery of the face of the flame cone. More specifically, the letter "A" is assigned to that location on the face of the flame cone wherein the "A" aligns with the marker 102 (arrow) on the rim 100 of the throughbore when the flame cone is threaded into the throughbore, at a given torque, and into fluid sealing engagement of the respective shoulders of the flame cone and the throughbore. By design, this relationship of the flame cone to its depth within the throughbore establishes the proper alignment of the exit channels of the flame cone with their respective targets within the combustion chamber. It is to be noted that if the circumferential shoulder within the throughbore includes an angled surface, an noted above, a conical washer is to be inserted within the throughbore and in overlying relationship to the shoulder within the throughbore thereby defining a continuous flat surface against which the flat face of the circumferential shoulder of the flame cone may sealingly engage when the flame cone is threaded into the throughbore. In those instances where the shoulder within the throughbore exhibits a flat face, no conical washer need be employed.

For one or more various reasons, the threading of the flame cone into the throughbore may vary between multiple entry and removal events of the flame cone. For example, the torque employed between such events may be such that the depth to which the flame cone enters the throughbore before "bottoming out" against the shoulder within the throughbore at a given torque may vary from event to event. Such variance can result in inaccurate rotational positioning of the exit channels of the flame cone relative to their intended targets within the combustion chamber.

In the present invention, this and like variances are accommodated. Specifically, in the present invention, a flame cone designed for the ICE in question is initially threaded into a throughbore in the head of the ICE until the respective circumferential shoulders of the throughbore and flame cone engage one another at a preselected torque value. This torque value is selected to produce fluid-tight sealing of the engaged shoulders against fluid flow therepast and is readily established by one skilled in the art.

When the initial threading of the flame cone into the throughbore is completed, the operator notes whether the "A" letter on the face of the flame cone is aligned with the marker on the rim of the throughbore. If yes, the flame cone, hence its exit channels, are properly aligned with respect to their intended targets within the combustion chamber and no further action need be taken with respect to the installation of the flame cone within the throughbore.

On the other hand, if the "A" on the flame cone is not aligned with the marker on the rim of the throughbore when the flame cone is fully threaded into the throughbore as described above, the operator notes that alpha letter which is nearest the marker. Thereupon the flame cone is withdrawn from the throughbore and an appropriate spacer washer is fitted onto the threaded end of the flame cone, atop the conical washer, to thereby limit the depth of insertion of the flame cone within the throughbore.

In one embodiment of the present invention, spacer washers of differing thicknesses are provided. Each spacer washer is identified with an alpha letter which is indicative of the thickness of the washer. In that embodiment where the spatial distance between alpha letters applied to the face of the flame cone and the pitch of threads employed in threading the flame cone into the throughbore, are known, one skilled in the art may readily calculate that thickness of a spacer washer which would limit the depth to which the flame cone would enter the throughbore upon rotation of the flame cone by a rotational distance commensurate with the space between adjacent ones of the alpha letters on the face of the flame cone. Thus, if the initial insertion of the flame cone into the throughbore resulted in the letter "C" being the closest letter to the marker on the rim of the throughbore, then a spacer washer marked "C" would be chosen for installation onto the flame cone and resulting alteration of the depth of the flame cone into the throughbore such that the "A" on the face of the flame cone would come into alignment with the marker on the rim of the throughbore. FIG. 15 is a typical lookup table listing typical thicknesses of spacer washers with their respective alpha identification.

The flame cone of the present invention is designed initially to ensure that the shoulder on the flame cone will seat with the shoulder on the wall of the throughbore when the "A" indicia is fully aligned with, or just short of alignment with, the marker on the rim of the throughbore. As noted, the spacer washers may affect the depth of insertion of the flame cone by only one revolution (one thread) of the flame cone within the throughbore. For a typical spark plug threads, such depth would be 1.25 mm or 0.05 inch.

Employing the concept of the present invention, in the method of the present invention, a user selects a flame cone which is designed for the ICE model in question and threadably inserts such flame cone into the throughbore in the wall of the head of the ICE until the circumferential shoulder of the cone sealingly engages the circumferential shoulder of the throughbore. The torque employed to effect such engagement is that torque which is commonly supplied by the engine provider. Further, that indicia which is closest to the arrow marker on the rim of the throughbore is also noted. For example, such closest indicia may be "B".

Thereupon, the flame cone is withdrawn from the throughbore. Employing the lookup table, the user locates that washer whose thickness carries the "B:" indicia (hence identifies that thickness of spacer washer which, when inserted into the throughbore in overlying relationship to the inner circumferential shoulder of the throughbore, will halt the depth of insertion of the flame cone in question such that the indicia "A" on the flame cone is aligned with the arrow marker on the rim of the throughbore. This chosen spacer washer is then fitted onto the threaded end of the flame cone and the flame cone and its associated washer(s), is again threadably and sealingly inserted into the throughbore, employing the same torque value as observed when the flame cone was initially inserted into the throughbore without the spacer washer being present. Under these conditions, the indica "A" on the face of the flame cone should be in alignment with the arrow marker on the rim of the throughbore. If not, the user notes that indicia which is closest to the arrow marker, the flame cone is withdrawn and the process of selection of a suitable spacer washer and insertion of the flame cone and its associated washer into the throughbore is repeated. Thereupon, the flame cone is again inserted into the throughbore employing the same initially employed torque value. If this further action does not cause the "A" indicia on the flame cone to be aligned with the arrow marker on the rime of the throughbore, the process is repeated until such alignment is accomplished. Upon achieving alignment of the "A" indicia with the arrow marker, the user is assured that the multiple exit channels from the flame cone are directionally aligned properly for their respective flame fronts to be directed toward the intended areas within the combustion chamber. Also, the user is assured that there is a fluid sealed relationship between the cone and the throughbore.

Should variations in depth occur for any of several reasons, such as change in torque between times of insertion of the flame cone into a throughbore, different starting positions of the flame cone between times of insertion of the flame cone into a throughbore, etc., the present invention accommodates such variations rapidly and accurately by means of the adjustability of the depth of a given flame cone within a given throughbore, irrespective of such variations. This accommodation is made possible by the ready determination of the depth of the flame cone within the throughbore through the means of visual observation of the disposition of alpha letters on the face of the flame cone relative to the fixed arrow marker on the rim of the throughbore and the available choices of adjustment of the depth to which the flame cone can enter into the throughbore. That is, irrespective of what alpha letter (other than "A")) is closest to the rim marker when the flame cone is threaded into the throughbore to an effective sealing position, the present invention provides one or more selectable spacer washers of different thicknesses, which, when inserted within the throughbore, are sufficient in overall thickness to adjust the depth of the flame cone within the throughbore to the extent that the "A" letter is aligned with the arrow marker on the rim of the throughbore upon the flame cone being torqued to that value which ensures suitable fluid sealing of the flame cone within the throughbore. Even if different torque values are employed between the initial and subsequent insertions of the flame cone into the throughbore, so long as the engagement between the circumferential shoulders (with or without spacer washers in the throughbore) effectively creates a fluid-tight seal between the flame cone and the throughbore, selection of one or more spacer washers may be employed to effect the required alignment of the "A" indicia on the face of the flame cone with the arrow marker on the rim of the throughbore, again thereby ensuring proper alignment of the exit channels from the flame cone into the combustion chamber of the ICE. It is to be noted that if the initial insertion of the flame cone into the throughbore results in the "A" indicia being in alignment with the arrow marker on the rim of the throughbore, there is no need for adjustment(s) of the depth of insertion of the flame cone into the throughbore.

It is to be recognized that, in the art. There commonly are multiple throughbores in a given ICE, i.e., one throughbore for each combustion chamber of the ICE. Thus for a given ICE, all the throughbores thereof are of essentially identical construction, including thread types. Again, irrespective of whether all the throughbores of a given ICE are of truly identical geometry, the present invention provides for adjustability of the depth of insertion of a flame cone in each of the throughbores through the choice of the spacer washers as described hereinabove.

While the present invention has been illustrated by description of several embodiments and while the illustrative embodiments have been described in considerable detail, it is not the intention of applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly departures may be made from such details without departing from the spirit or scope of applicant's general inventive concept.

The invention claimed is:

1. A method for installation of a flame cone of a pre-ignition system for ignition of a fuel/gas mixture within a combustion chamber of an internal combustion engine, comprising the steps of:
   (a) providing a flame cone having an inboard end and an opposite outboard open end,
   (b) defining adjacent said inboard end of said flame cone at least one exit channel adapted to provide fluid communication of a flame front from a location within said flame cone through said exit channel and toward a target location internally of the combustion chamber of the internal combustion engine;
   (c) providing a first indicia on said outboard end of said flame cone, said first indicia being visually observable from a location external of the internal combustion engine and further indicative of the physical location and attitude of said at least one exit channel;
   (d) providing multiple further indicia on said outboard end of said flame cone at spaced apart locations about the outer periphery of said outboard end of said flame cone and being visible for a location external of the internal combustion engine,
   (e) providing a circumferential shoulder about the outer circumference of said flame cone at a location intermediate said inboard and outboard ends of said flame cone, said shoulder extending radially outward of said outer circumference of said flame cone;
   (f) defining an elongated throughbore through the head of the internal combustion engine, and throughbore having an open inboard end which opens internally of the combustion chamber of the internal combustion engine and an open outboard end opening to the environmental external of the head, whereby said throughbore defines a passageway between said combustion chamber and the environment external of the head,
   (g) defining a circumferential shoulder internally of said throughbore at a location intermediate said inboard and outboard ends of said throughbore, said shoulder extending radially inwardly of said throughbore a distance sufficient to engage and limit the extent of insertion of said flame cone into said throughbore;
   (h) providing a reference marker on said head adjacent the outboard open end of said throughbore, said reference marker being visually exposed from a location external of said internal combustion engine;
   (i) inserting said flame cone into said throughbore via said outboard open end of said throughbore to the extent that said shoulder of said flame cone sealingly engages said shoulder within said throughbore,
   (j) if said first indicia is not aligned with said reference marker upon completion of step (i), removing said flame cone from said throughbore,
   (k) altering the depth of which said flame cone will extend into said throughbore and effect a sealing relationship with said throughbore and said first indicia also will be aligned with said reference marker.

2. Apparatus for aligning one or more flame front exit channels of a flame cone within a throughbore having an open inboard end and an open outboard opposite end, defined through the wall of the head of an internal combustion engine, comprising:
   (a) flame cone having an open outboard end and an inboard end having one or more flame front exit channels defined therein, (b) means for adjustably inserting said flame cone within said throughbore via said outboard open end of said throughbore, (c) a reference marker defined on said head adjacent said outboard open end of said throughbore, (d) a first indicia defined on said outboard end of said flame cone, said first indicia being indicative of the position and attitude of at least one of said indicia on said outboard end of said flame cone, (e) a plurality of further indicia defined on said outboard end of said flame cone at spaced apart locations about the outer perimeter of said flame cone, (f) said reference marker and said indicia being visually observable from a location external of said internal combustion engine, (g) a plurality of spacer washers of different thickness for selectively adjusting the depth to which said flame cone enters said throughbore and effects a fluid sealing relationship between said flame cone and said throughbore and alignment of said first indicia with said reference marker.

3. A method for installation of a flame cone of a pre-ignition system for ignition of a fuel/gas mixture within a combustion chamber of an internal combustion engine, comprising the steps of:

(a) from a location external of the head of an internal combustion engine inserting a flame cone, having at least one flame front exit channel adapted to direct a flame front from the flame cone into the combustion chamber of the internal combustion engine along a throughbore toward a target location within the combustion chamber of the internal combustion engine, into said throughbore to a first depth, (b) providing a plurality of indicia on said flame cone which are visible from a location external of the internal combustion engine, a first one of said indicia being indicative of the desired rotational position of said flame cone within said throughbore wherein said at least one exit channel is oriented toward its intended target location within the combustion chamber, (c) providing a point of reference on said cylinder head proximate said throughbore and which is visible from a location external of the internal combustion engine, (d) inserting said flame cone into said throughbore to a predetermined depth of sealingly engagement there between, (e) noting that indicia on said flame cone which is closest to said point of reference on said head when said flame cone achieves said sealingly engagement, (f) if said indicia on said flame cone which is noted is said first one of said indicia when said flame cone and said throughbore are in sealing engagement with one another, no further action need be taken, (g) If said indicia on said flame cone which is noted is an indicia other than said first one of said indicia, removing said flame cone from said throughbore;

(h) thereafter, selecting at least one spacer washer having a thickness corresponding with said noted indicia and installing said selected spacer washer onto the flame cone, to be engaged with the sealing surface of the throughbore, (i) replacing said flame cone into said throughbore in sealing engagement between said selected spacer washer with said throughbore.

4. The method of claim 3 wherein said steps (d) through (i) are repeated until said first one of said indicia on said flame cone is in rotational alignment with said reference point defined on said head when the flame cone and its associated spacer washer are at least one in sealing engagement with the throughbore.

5. The method of claim 3 wherein said indicia on said flame cone are disposed about the outer periphery of said outboard end of said flame cone and spaced apart substantially equidistantly.

6. The method of claim 3 and including the step of providing mating threads on each of said flame cone and said throughbore whereby said flame cone is threadably insertable within said throughbore.

7. The method of claim 6 and including the step of forming said threads of each of said flame cone and said throughbore of substantially like thread classification.

* * * * *